Patented July 1, 1930

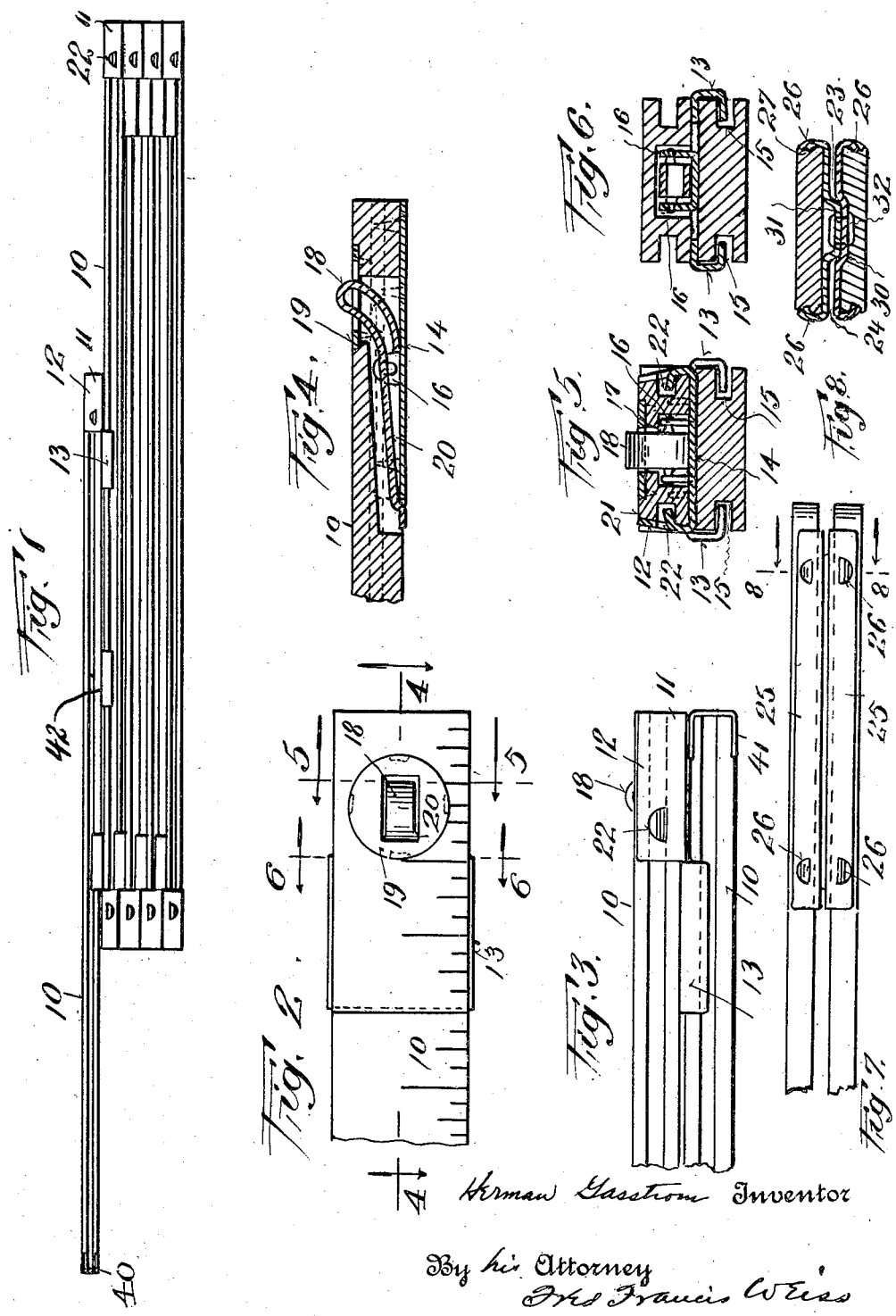
July 1, 1930. H. GASSTROM 1,768,679
EXTENSION RULE
Filed June 2, 1925

1,768,679

UNITED STATES PATENT OFFICE

HERMAN GASSTROM, OF MOUNT VERNON, NEW YORK

EXTENSION RULE

Application filed June 2, 1925. Serial No. 34,360.

This invention relates to improvements in the joint members or clamp for extension rules and has for its object the provision of a rule clamp which is readily manufactured, easily applied to the rule and which is very effective in securing the clamp in place.

Another object includes the provision of a clamp which is inexpensive to manufacture and wherein holding lugs are provided for ready application when the rule joints are assembled. I further produce the holding lugs on opposite sides of the clamp for certain and quick application to the rule, thereby forming a triangular positive grip, even if material used should shrink from original size and whereby it is possible to quickly assemble the clamp and rule joints.

Other objects will appear hereinafter and I obtain these objects by the construction illustrated in the accompanying drawing, in which Fig. 1 is a side elevation of a rule which is provided with joint members and clamps that are made and applied in accordance with the principles of my invention, Fig. 2 is a plan view of a portion of a rule provided with my improved joint and clamp, Fig. 3 is an enlarged side elevation of a part of a rule and showing the clamp and side lug, Fig. 4 is a view taken on the line 4—4 of Fig. 2, Fig. 5 is a view taken on the line 5—5 of Fig. 2, Fig. 6 is a view taken on the line 6—6 of Fig. 2, Fig. 7 is a side elevation of a folding rule wherein a different type of clip is provided with my improved lug, and Fig. 8 is a view taken on the line 8—8 of Fig. 7.

Like numerals refer to similar parts throughout the several views.

In the manufacture of extension rules, it is important that the joints be so constructed as to provide a firm and reliable connection between the rule ends or individual lengths so that the rule can be quickly opened to the correct length and position. It is also very desirable that the joint members be simple in construction and that these members be so shaped and constructed as will enable the manufacturer to quickly assemble the parts and in one and the same operation securely fasten the parts together. In my improved joint clamp, I have provided a construction which will provide the above named and other desirable features, and which is readily applied to similar members without materially adding to the cost of manufacture.

In the accompanying drawings, I have shown a practical application of my invention to rule joints for the sliding and the pivotally folding types of rules. These drawings are for the purpose of illustration merely and are not to be taken in a limiting sense.

In a preferred form of construction, the rule lengths 10, 10 are provided with joint members or clips 11, 11 for holding the joints together. The joints may be either of the sliding type as is shown in Figs. 1 to 6 for example, or they may be of the folding type shown in Figs. 7 and 8 for example. In the sliding type of rule, the clip consists of the holding part 12 and the sliding part 13. These parts are formed from a plate 14, the former part being struck up from said plate and the latter being bent down and shaped to embrace the rule length 10, and the ends of the downward bent parts enter the side grooves 15, 15 of the adjacent rule length to permit the same to slide therein when the rule is opened or closed. It will be observed from Fig. 1 that the clips on the right hand end of the rule lengths have the sliding part turned downwards and those at the left hand end are reversed so that each rule length has a pair of slide guides from each end to thereby hold the parts together. Each plate 14 is also provided with ears 16, 16 for engaging tabs 17 on the spring member 18. The spring member 18 projects above a plate to engage its companion and thus locks the parts in either the open or the closed position.

As is best shown in Figs. 3 and 5, the clip holding part 12 is beveled to engage the tapered part 21 of the rule ends and on each side of this part there is provided a holding lug 22. This lug is formed with a blank and then when the clips and rule lengths are assembled the lugs are punched down into the groove 15 from opposite sides of the rule to fasten the clip in place on the ends of the rule lengths. This construction secures the clips to the rule without damaging the wood. The lugs can be also easily loosened for replacement of broken rule sections. It is understood that these lugs may be formed in any manner and position best suited for the purpose at hand; also that in some instances more than one lug on each side may be provided.

The free end sections of the sliding rule are provided with end clips 40 and 41, and an abutment 42 limits the extent to which the first joint opens.

A construction having more than one lug on each side of the clip is shown in Figs. 7 and 8. The particular construction here shown is designed for a folding type of clip. Here the joint members comprise plates 23 and 24 having side engaging flanges 25. Plate 23 has a depression or mid rib 30 and plate 24 has a similar elevation 31 to fit into the depression. A rivet 32 holds the parts together. These plates are secured at 27 on the side of the rule by the lateral flanges 25, 25 and lugs 26, 26. These lugs are formed in the flanges 25 and securely hold the plates in place.

While I have described specific embodiments of my invention, I do not thereby desire to be understood as having limited myself, as various modifications falling wholly within the spirit and scope of my invention will suggest themselves to those versed in the art.

What I claim therefore as new and useful and desire to secure by Letters Patent, is:—

1. In a rule length having grooves, a joint comprising a plate and oppositely displaced parts to fit over the sides of adjacent rule lengths, one of said parts forming a sliding part and the other a holding part and flanges on said parts having holding lugs extending into said grooves to firmly but removably secure said holding part to a rule length without damaging the rule.

2. A rule joint comprising a plate having oppositely displaced parts to fit over and engage the lateral sides of adjacent rule lengths, said rule lengths having grooves for slidable engagement of one of the said displaced parts and lugs in the other of said displaced parts for engaging the grooves of the adjacent rule length to thereby secure said length unimpaired.

3. An extension rule composed of rule lengths having grooves along the opposite narrow sides thereof, end joints for extending said lengths, said joints comprising plates provided with pairs of counterwise disposed flanges adapted to take over said sides of adjacent rule lengths, and lugs formed with one pair of said flanges, said lugs when depressed clasping intermediately thereof and the thereto appertaining plate the parts of the said sides intervening between their grooves and the face of the rule lengths.

HERMAN GASSTROM.